(12) United States Patent
Rotsch et al.

(10) Patent No.: US 12,195,825 B2
(45) Date of Patent: Jan. 14, 2025

(54) SYSTEM AND METHOD FOR PRODUCING MOLYBDENUM 99

(71) Applicant: UCHICAGO ARGONNE, LLC, Chicago, IL (US)

(72) Inventors: David A. Rotsch, Montgomery, IL (US); Thomas W. Brossard, Naperville, IL (US); Ronald T. Kmak, Homer Glen, IL (US); Peter Tkac, Naperville, IL (US)

(*) Notice: Subject to any disclaimer, the term of this patent is extended or adjusted under 35 U.S.C. 154(b) by 1232 days.

(21) Appl. No.: 16/916,278

(22) Filed: Jun. 30, 2020

(65) Prior Publication Data
US 2021/0407699 A1 Dec. 30, 2021

(51) Int. Cl.
| | |
|---|---|
| *C22B 34/30* | (2006.01) |
| *C01G 39/00* | (2006.01) |
| *C22B 34/34* | (2006.01) |
| *G21G 1/00* | (2006.01) |

(52) U.S. Cl.
CPC ............ *C22B 34/30* (2013.01); *C01G 39/003* (2013.01); *C22B 34/34* (2013.01); *G21G 1/001* (2013.01); *G21G 2001/0036* (2013.01)

(58) Field of Classification Search
CPC ....... C22B 34/30; C22B 34/34; C01G 39/003; G21G 1/001; G21G 2001/0036
See application file for complete search history.

(56) References Cited

PUBLICATIONS

G. F. Vandegrift, et al., "Full-Scale Demonstration of the Cintichem Process for the Production of Mo-99 Using a Low-Enriched Target," 1998 International Meeting on Reduced Enrichment for Research and Test Reactors, Oct. 18-23, 1998, Sao Paulo, Brazil, 9 pages.

*Primary Examiner* — Melissa S Swain
(74) *Attorney, Agent, or Firm* — CHERSKOV FLAYNIK & GURDA, LLC

(57) ABSTRACT

The invention provides an automated method for isolating a targeted isotope, the method having the steps of supplying a dissolved uranium targets into a first reaction environment; precipitating non-targeted isotope within the first reaction environment transferring liquid phase targeted isotope to a second reaction environment; precipitating the liquid phase targeted isotope in the second reaction environment; dissolving the precipitated targeted isotope; transferring the dissolved targeted isotope to a third reaction environment; and precipitating non-targeted isotope (i.e., iodine), such that the targeted isotope remains in the solution. Also provided is an automated system for isolating isotopes, the system having a plurality of reaction environments adapted to pneumatically receive and disgorge reactants and products via remotely actuated valves positioned between each of the reaction environments.

11 Claims, 2 Drawing Sheets

SYSTEM AND METHOD FOR PRODUCING MOLYBDENUM 99

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to streamlining the production of medical isotopes, and more specifically, this invention relates to a system and method for automating the production of Molybdenum 99.

2. Background of the Invention

Radioactive isotopes are widely used to image problem areas in the body, for example tumor sites, and blockages. Isotopes also are loaded into vehicles (such as stents) and positioned in selected sites in the body to locally treat disease, such as cancer, in a process known as brachytherapy.

Salient isotopes, such as Molybdenum 99 (Mo-99), Iodine-131 (I-131), and Xenon-133 (Xe-133), are all generated from particle bombardment of uranium targets. A feature of the isotopes is their short half-life so as to not pose a radiation risk to otherwise healthy tissue adjacent to diseased tissue. Generally, half-lives ($t_{1/2}$) of between 1 hour and 180 hours are typical.

Technetium-99m (Tc-99m), the medically relevant daughter of Mo-99, is one of those short half-life isotopes. Mo-99 has a half-life of 66 hours. While this short half-life assures that patients will not get unnecessarily irradiated, it also means that Mo-99 (and/or its daughter isotope Technetium 99) must be utilized quickly once it is isolated from a uranium target.

Mo-99 is utilized as a generator for Tc-99m. This is possible due to the half-life difference between Mo-99 ($t_{1/2}$=66 hours) and Tc-99m ($t_{1/2}$=6 hours).

Mo-99's half-life enables shipment of the generator system worldwide; however, it must be isolated quickly from its production target (uranium, Mo-100, Mo-98, etc.), as 1 percent of the usable Mo-99 is lost per hour after its production.

One such isolation method is the Cintichem process, named for the Cintichem Facility in New York. The purification of fission Mo-99 by Cintichem uses glassware specifically designed for remote operation in hot cells and small initial solution volumes (e.g., 50 mL). Cintichem is applicable to both high enriched uranium (HEU) and low enriched uranium (LEU).

The Cintichem process consists of several purification steps, with significant attention given to the removal of radioactive iodine. The starting solution contains fission products, including Mo-99 and 1 M $HNO_3$, usually attained from the digestion of HEU or LEU targets with $HNO_3$.

A key reagent of the Cintichem process is α-benzoin oxime (ABO). ABO allows selective precipitation of molybdenum from acidic conditions (approximately 1 M $HNO_3$) where molybdenum is present as molybdenyl cation ($MoO_2^{2+}$) to form the following complex:

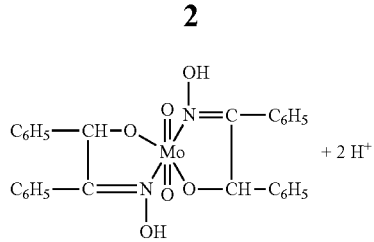

More recently, non-critical solution reactors have gained interest, where the standard solid uranium targets are replaced by solutions of uranium, such as uranyl sulfate. For solid targets, most of the iodine is present as $I_2$ and is collected in iodine traps, although, other iodine species, such as $I^-$, $IO_3^-$ and $IO_4$, may form during fission. Iodine speciation from accelerator driven processes on LEU solutions are expected to be similar to solid targets; however, their distributions will be different.

The LEU-Modified Cintichem (LMC) process purifies Mo-99 from solid or solution targets, with emphasis on the removal of iodine in its many forms. There are 25 discrete steps involved with the Cintichem process and more than 300 sub-steps. As such, it is extremely labor intensive. One of the most challenging aspects of the process is the need to continuously re-arrange bottles. Solutions and mixtures are transferred by gravity from vessel to vessel with double-ended needles inserted through rubber septa. If a septum is pierced repeatedly with a needle, a leak path may be formed, which could result in significant loss of product and the release of fission gases outside of the primary containment. For example, if 10,000 mCi initially resides in a solution, a 1 drop leak equals about 0.1 mL. So, a 0.2 percent product loss (20 mCi) can occur with every wayward drop. Beyond the loss of product, this represents a significant contamination and safety issue. One drop may result in Occurrence Reporting and Processing System (ORPS) and Nuclear Regulatory Commission (NRC) reporting. If too many reports occur, license for working with radioactive material can be revoked Another concern is the need for a highly skilled workforce to perform this process. The process can require up to two manipulator operators and a supervisor to oversee the process and collect notes. These requirements make numerous simultaneous and continuous batch processing economically unfeasible.

A need exists in the art for an efficient system and method for isolation of desired isotopes from HEU and LEU targets. The system and method should minimize physical manipulation by human operators. Ideally, the system and method should consist of semi-automation and/or full automation that utilizes reaction-generated environmental conditions and other inputs (e.g., heat, pressure) to transfer solution throughout the system and without physical movement of the reaction vessels or bottles.

SUMMARY OF INVENTION

An object of the invention is to provide a system and method for producing medical isotopes that overcomes many of the drawbacks of the prior art.

Another object of the invention is to provide a system and method for efficiently purifying medical isotopes. A feature of the invention is applying an automated or semi-automated process for complex isotope separations. Another feature of the invention is the elimination of repeated penetrations of rubber septa with needles and other access instruments. An advantage of the invention is that the amount of involvement by highly trained personnel is reduced at least three-fold for a single operation. Further, a single operator is able to oversee several simultaneous operations at once, thus decreasing the demand for highly trained personnel even more. Another advantage is eliminating the aforementioned septum leaks and any gas or product that is under reaction pressure. (For example, the heating process involved in the dissolution of a Mo-ABO complex increases reaction vessel pressure. Further, if there is any heat through chemical reactions, pressure will increase. Also, heat may be generated by radioactive decay.) Other advantages include reproducibility of the operation and exclusion of human error during operation.

Still another object of the invention is to provide a system and method for isolating Mo-99. A feature of the invention is the utilization of both positive and negative pressure to transfer solutions throughout the system and without physical movement of the reaction vessels or bottles. Rather, solution transfers occur after predetermined times when fluid transfers to other vessels in the system are ceased, such as via programmed servo motor actuated stop-cocks or solenoid valves via software (e.g., Labview®). An advantage of the invention is that the time to conduct a typical LEU modified Cintichem process is reduced to approximately 50 percent of its original duration, resulting in less product loss due to decay and therefore higher revenue due to more product available for sale.

Yet another object of the invention is to provide an automated system and method for isolating target isotopes from uranium targets, the isotopes including Molybdenum 99 (Mo-99), Iodine-131 (I-131), and Xenon-133 (Xe-133). A feature of the invention is the utilization of a three trap system. An advantage of the three-trap system is that the useful life of critical hardware (such as vacuum pumps, sensors, conduit, etc.) is extended, thereby minimizing maintenance and laboratory personnel involvement. Another advantage is the minimization of fission gas releases and reduction of product loss.

Another object of the invention is to provide an automated system and method for isolating medical isotopes that are safer for the environment and operating personnel. A feature of the invention is that reagent containers are relegated to areas outside of the hot cell, the latter of which houses the actual separation process and hardware. An advantage of the invention is a minimization of secondary waste, and minimization of radiation exposure to the environment and personnel.

In brief, the invention provides an automated method for isolating a targeted isotope, the method comprising placing isotope source material (such as dissolved uranium targets or Mo-99 source material) into a closed-loop pneumatic system and contacting the source material to positive and negative pressures to transport the source material to a first step of precipitating out non-targeted isotopes; transporting the remaining liquid containing targeted isotope to a second step of precipitating the targeted isotope; transporting the precipitated targeted isotope to a third step to isolate precipitated targeted isotope and filter undesired impurities; re-liquifying the precipitated targeted isotope; transporting the liquefied targeted isotope to a series of filters to separate iodine, organics and other impurities from the liquefied targeted isotope; thereby rendering a final filtered liquefied targeted isotope.

Also provided is an automated system for isolating isotopes, the system comprising a first reaction environment adapted to pneumatically receiving a fission product liquor; a second reaction environment in fluid communication with the first reaction environment and adapted to pneumatically receive isotope complexing compound; an isolation environment in fluid communication with the second reaction environment and adapted to pneumatically receive a slurry (solid and liquid) complex of isotopes, a third reaction environment in fluid communication with the isolation environment and adapted to pneumatically receive a liquefied complex of isotope; a first purification column positioned downstream of the third reaction environment and adapted to retain iodine and other solid impurities, a liquid isotope eluent vessel positioned downstream of the purification column, a second purification column positioned downstream from the liquid isotope eluent vessel, a product retention vessel positioned downstream from the second purification column, a first remotely actuated valve between the first and second reaction environment and a second remotely actuated valve between the second and the isolation environment, a third remotely actuated valve between the isolation environment and the third environment, a fourth remotely actuated valve between the third environment and the first purification column, a fifth remotely actuated valve between the purification column and the liquid isotope eluent vessel, a sixth remotely actuated valve between the liquid isotope eluent vessel and a second purification column, a seventh remotely actuated valve between the second purification column and the product vessel, wherein the first and second and third and fourth and fifth and sixth and seventh valves are adapted to open and close after reactions occur in the first-, the second-, the isolation-, and third-reaction environments, and liquid eluent vessel.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
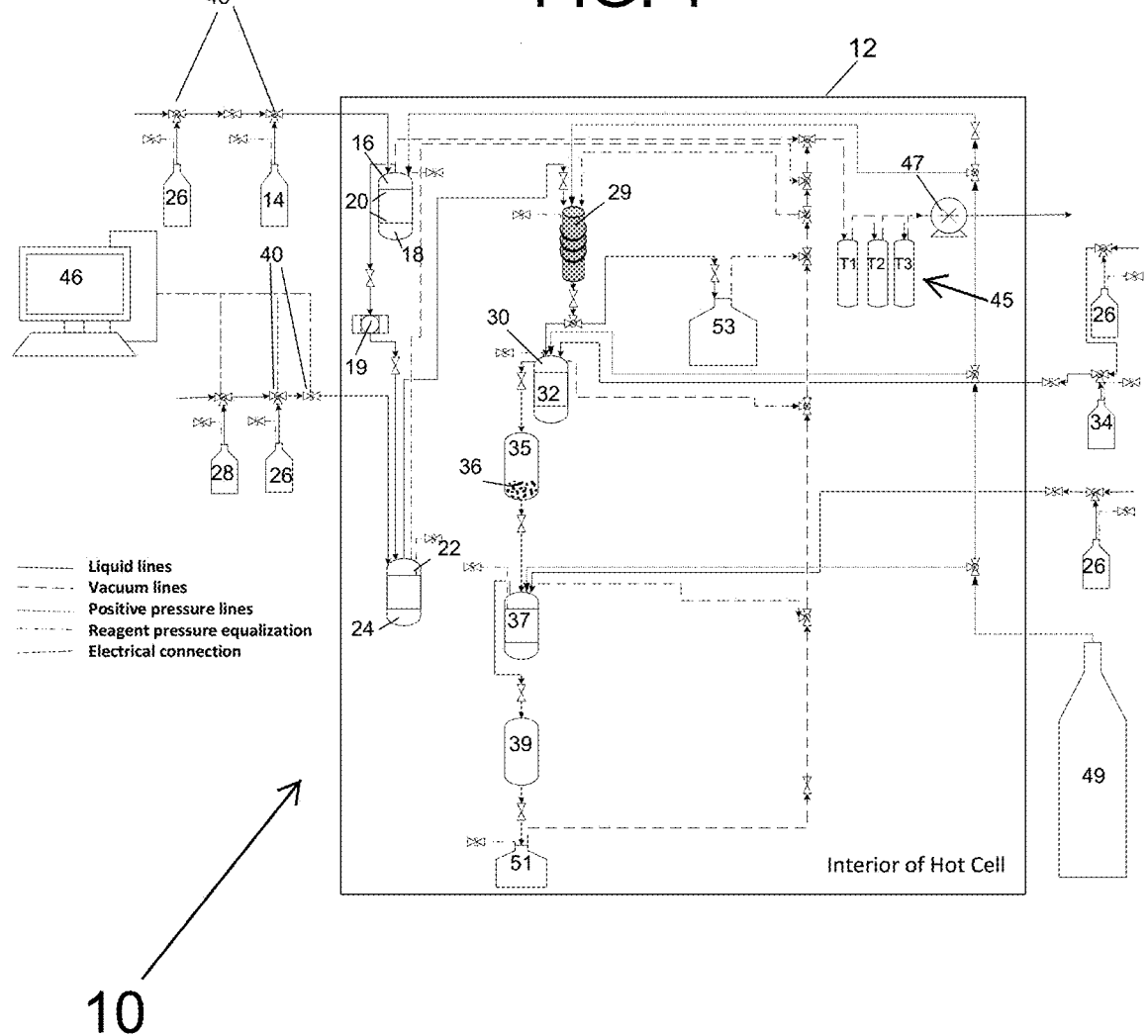
FIG. 1 is a schematic diagram of an automated isotope isolation process, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property. An embodiment of the invention provides a semi-automated system or an automated system and method for isolating and purifying Mo-99 from fission products of uranium targets.

The streamlined process and system are effectuated by the imposition of pressure gradients, wherein pressures in serially positioned reaction environments are, applied and/or removed when predetermined reaction parameters are established. The reaction parameters may be data points selected from the group consisting of product temperature, reaction vessel temperature, precipitate opacity, reaction vessel pressure, reaction time, and combinations thereof.

Specifically, the isolation process begins with supplying a first liquor having a first pH, comprising dissolved uranium targets (or Mo-99 source material) in a first reaction environment. This first pH liquor (e.g., 1 M $HNO_3$ having a pH of approximately 0) contains the targeted isotope in liquid phase and non-targeted isotopes (such as iodine), also in liquid phase. The non-targeted isotopes are then precipitated by addition of a precipitation agent (e.g., $AgNO_3$+NaI). As such, the non-targeted isotopes can be removed by filtration.

Positive pressure is then applied to the first reaction environment and negative pressure on a second reaction environment to transfer the liquid phase targeted isotope to the second reaction environment while simultaneously filtering out the precipitated non-targeted isotopes (AgI—solid). Negative pressure may be attained by use of a diaphragm or vacuum pump.

The second environment is where selective precipitation of the liquid phase targeted isotope occurs. Preferably, the targeted isotope (e.g., Mo) is present as $MoO_2^{2+}$ so as to combine with a complexing agent (e.g., ABO). Acid (such as HCl and $HNO_3$) is added to establish a second pH liquor lower than the first pH liquor. The complexing agents, such as aldoxime and/or ketoxime solutions are supplied in NaOH or some other alkaline. The overall pH of the final complexing liquor (the second pH liquor) residing in the second reaction environment is still lower than the first pH liquor.

This second pH liquor dwelling in the second reaction environment therefore contains the Mo-aldoxime or Mo-ketoxime complex (e.g., Mo-ABO).

As with other valve actuations in this automated process, an egress/ingress valve between the second reaction environment and an isolation environment is then opened, this valve actuation occurring remotely and automatically, based on reaction time, temperature, pH values, or vessel pressures or some other value first empirically determined and then written into the software driving valve actuation parameters. For example, the second reaction environment is subjected to a positive pressure while concomitantly a relatively lower pressure exists in the isolation environment to an extent necessary to induce transport of the selectively precipitated targeted isotope into the isolation environment.

With the targeted isotope now in solid phase and contained in the isolation environment, an acid wash is employed to remove remaining non-targeted, dissolved isotopes, to leave a more purified solid isotope complex.

The more purified solid isotope complex remaining in the isolation environment is dissolved in an alkaline solution (e.g., NaOH+$H_2O_2$ as described infra). As such, this alkaline solution has a third pH higher than that of the second pH liquor. Valves disposed between the isolation environment and a third reaction environment are automatically actuated (perhaps due to time, the aforementioned second to third pH change, or reaction pressure change within the isolation environment or imposed from outside the reaction environment). For example, an external positive pressure is applied to the isolation environment to transfer the dissolved targeted isotope to the third reaction environment.

In the third reaction environment, the third pH liquor (containing dissolved targeted isotope and dissolved non-targeted isotope such as Iodine) is combined with a solution ($AgNO_3$+NaI) to establish a fourth pH liquor having a pH lower than the third pH so as to precipitate non-targeted isotope. As such that the targeted isotope remains in the fourth pH solution. The targeted isotope remaining in the fourth pH solution is then subjected to an alkaline solution wash (e.g., 0.2 M NaOH) or washes to remove any remaining impurities. The targeted isotope remains in solution in the third reaction environment.

Subsequent polishing steps of the targeted isotope are discussed infra.

Transfers between reaction environments occur by imposing reaction created conditions, or externally applied inputs, for example, the latter being the imposition of a higher pressure in the original vessel and a lower pressure in the vessel in which the material is to be transferred or in combination of higher or lower pressure in any vessel that is in communication with the original vessel. Time is a significant indicator as to when transfer may take place.

In an embodiment of the invention, the second reaction environment is maintained at a pressure lower than the first reaction environment during transfer of material from the first to the second environment; the isolation environment is maintained at a pressure lower than the second reaction environment during transfer of material from the second to the isolation environment; the third reaction environment is maintained at a pressure lower than the isolation environment during transfer of material from the isolation environment to the third environment; the fourth reaction environment is maintained at a pressure lower than the third reaction environment during transfer of material from the third to the fourth environment; and the product vessel is maintained at a pressure lower than the fourth reaction environment during transfer of material from the fourth environment to the product vessel.

Fluid communication or access to any reaction environment is prevented by use of actuated valves between each reaction environment. Access may be controlled based on reaction time, temperature, pressure, pH, or a combination of these parameters. For example, access to the first reaction environment may be prevented when the third reaction environment is accessed. Actuated valves controlling access to the first reaction environment may be closed when solenoid valves controlling access to the second and third reaction environments are open. A myriad valve types may be utilized. For example, the valves may be solenoids, pneumatically actuated valves, servo-motor actuated valves, or combinations thereof.

Key steps of the invention include Mo-alpha-benzoin-oxime (Mo-ABO) complexation and precipitation, Mo-ABO wash, and Mo-ABO dissolution. The invention minimizes the amount of material wastage, including reagents, ABO-oxime, and actual product. This in turn results in the minimization of lost product.

Major components of the invented system and method include the following:

Four reaction environments;
One isolation environment (preferably a double-ended fritted vessel,);
Two purification columns (Ag/C column and a 3-phase column);
One waste vessel (but multiple waste vessels can be added if desired); and
One product vessel.

The invention is designated in FIG. 1 as numeral 10. A salient feature of the invention is the use of remotely actuated valves, 40, such as solenoid valves or actuated stop-cocks, to automatically provide fluid access (or deny such access) to certain reaction environments (e.g., vessels) and not others. The valves may be actuated via a myriad of cues, including predetermined reaction times of reactants within each reaction environment, temperatures or pressures created within each reaction environment, UV or IR spectroscopy/calorimetry, color changes, and combinations thereof. Most of the reaction steps are 1-5 minutes each. Valves are set to automatically open after the reactions in the associated reaction chamber are complete or substantially complete.

At least part of the system is meant to be placed within an appropriately shielded enclosure (designated as numeral 12 in FIG. 1) or hot cell with an appropriate exhaust ventilation system. For example, the first, second, and third reaction environments and the isolation environment may be maintained within a hot cell, while reagents (generally designated as 26, 28) for the method are maintained outside of the hot cell. Other components may also be confined to the hot cell, including additional reaction environments, phase columns, purification columns, waste vessels, and final product vessels.

Mo-99 source vessels may be inserted into the cell and then attached to the system. Alternatively, the Mo-99 source vessel can be inserted into a connecting feature (akin to a vestibule) and then connected to the system. The latter connection would require an extended conduit compared to the first but may be more beneficial in that the source vessel does not have to enter a contamination environment.

The final product is isolated in 0.2 M NaOH. The major waste stream is referred to as the Fission Fragment Bottle/Waste, composed of fission fragments, unused ABO, Rh and Ru carrier, $KMnO_4$, and acid washes. Optionally, multiple waste streams may be collected with the placement of additional waste vessels in series with the first waste vessel and placing valves between each of the vessels for selective filling of same.

FIG. 1 is a schematic drawing of the invented automated process for isolating a targeted isotope. Generally, non-automated protocols of these isotope separations have been published, for example, G. F. Vandegrift, et al, 1998 *International Meeting on Reduced Enrichment for Research and Test Reactors*, Oct. 18-23, 1998, São Paulo, Brazil.

A first liquor 14 is supplied, having a first pH, and comprising dissolved uranium targets and dissolved non-targeted moieties. This first pH liquor is sequestered in a first reaction environment 16.

Non-targeted isotopes are precipitated 18 within the first reaction environment 16. In-line filters 19 can be placed between the reaction vessels to remove unwanted materials that have been precipitated. Reagents 26 used to drive this portion of the process include NaI, $AgNO_3$, and HCl. NaI is added first, $AgNO_3$ is added second, and HCl is added last, with the solution mixed after each addition. A single reagent bottle 26 is depicted, but merely to represent the presence of reagent(s) and not the number or type. As discussed throughout this description, fluid communication between reagent containers 26, the various environments, and pressure lines are controlled via remotely situated and operated valves 40. Sensors (e.g., electrochemical based sensors) also may be used when transfer is effectuated based on reaction pressures, pH changes, or product concentrations.

Subsequently, a first pressure is applied to the first reaction environment 16 to transfer liquid phase 20 targeted isotope to a second reaction environment 22, which is maintained at a second pressure lower than the first pressure. It should be appreciated that the pressure differences may be imposed by a positive pressure 49 applied upstream of the reaction environments, or by negative pressure pull 47 positioned downstream of the reaction environments, or a combination of both.

Liquid phase targeted isotope 20 in the second reaction environment 22 is then mixed with a solution to facilitate precipitation of the target isotope. This precipitating solution 26 may include complexing agents (e.g., aldoximes and ketoximes), $KMnO_4$, and Rh/Ru hold-back agents, colloquially referred to as carriers. In this instance these "carriers" hold back Ru and Rh so that the latter do not follow or are not included in the Mo-ABO precipitate.

Exemplary complexing agents of the aldoxime and ketoxime groups or genuses comprise α-benzoin oxime (ABO as discussed supra), anti-diphenylglyoxime, 1,2-cyclohexane-dione dioxime, dimethylglyoxime, (E)-benzaldehyde oxime, other di-oximes, and combinations thereof.

As such, the second reaction environment, 22, is where the Mo-ABO complex is formed, and within a second pH liquor lower in pH than the first pH liquor. Such lowering may be via the addition of 4 M $HNO_3$.

Figure 2:
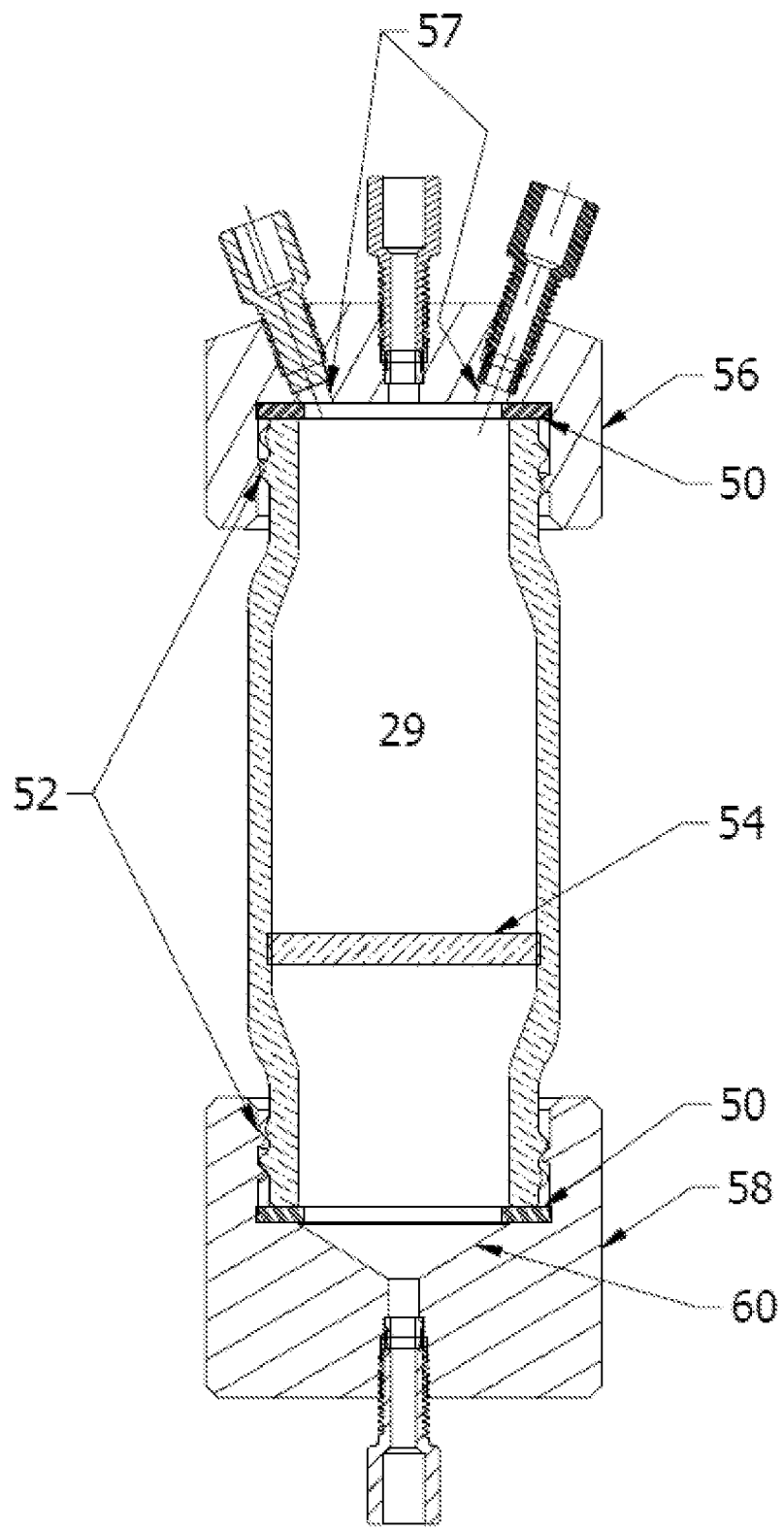
FIG. 2 is an elevational view of an isolation vessel with a multi-port cap, in accordance with features of the present invention.

FIG. 2 depicts an exemplary isolation environment defined by the fritted (isolation) vessel 29, which is positioned downstream of the second reaction environment 22. The isolation environment comprises the fritted reaction vessel housing a strainer (e.g., a sintered-glass frit) 54 to facilitate ABO complexation and later re-solvation or dissolution. The isolation environment 29 allows the Mo-ABO solid to be isolated, filtered, and washed. The Mo-ABO is isolated on the sintered glass frit 54 and then rinsed to remove unwanted, liquid entrained components of the mixture, such as Rh/Ru and other impurities. Unwanted solutions may be collected in a fission fragment bottle 53 positioned downstream of the isolation environment 29.

The moieties of the Mo-ABO complex 24 are then uncoupled via a series of dissolution solutions applications. Generally, this reaction phase occurs in a third pH liquor, wherein its pH is higher than the second pH liquor.

Constituents of the third pH liquor include NaOH and $H_2O_2$. The dissolution solution 28 is added to the second reaction environment 22 and then transferred to an isolation environment 29 positioned downstream. Constituents of the second solution may include an equal or lower concentration of NaOH and an equal amount of $H_2O_2$ as the first solution. For illustrative purposes only, the first of two solutions may comprise 0.4 M NaOH 1% $H_2O_2$, while the second solution may comprise 0.2 M NaOH 1% $H_2O_2$.) Each solution is first and individually added to the second reaction environment 22 to assist in transferring any residual solids that did not transfer during the first transfer of the slurry made in the second reaction environment. As such, this process step provides a means for washing the interior of the second reaction environment 22 and increase product yield.

Each solution may be individually transferred to the isolation environment 29 where they are mixed and heated with the solid isotope of interest. After a set period of time, the solutions are transferred from the isolation environment 29 to a third reaction environment 30.

A third pressure is applied to the isolation environment 29 to transfer the dissolved targeted isotope to a third reaction environment 30, which is maintained at a fourth pressure that is lower than the third pressure. Both dissolution solutions are now isolated within the third reaction environment 30.

The now dissolved targeted isotope 32 is combined with solutions 26, 34 containing $AgNO_3$ and NaI to precipitate non-targeted isotope 36. The still dissolved targeted isotope 32 is then directed to a first purification column 35 to facilitate additional separation of residual non-targeted material 36 via filtration of the precipitated (solid) non-targeted isotope. Non-targeted isotope is precipitated by the addition of NaI, then $AgNO_3$ dissolved in $HNO_3$ (e.g., 0.1 M $HNO_3$). This first purification column 35 is a combination of Ag-coated charcoal and provides a third means for removing residual non-targeted material such as solid phase iodine (AgI) 36 and organic material (such as fragments of the precipitating agent(s) used: aldoxime and ketoxime groups) from the product liquor.

A fourth pressure that is positive is applied to the Reaction Environment 3, 30, to transfer the mixture through the first purification column 35, to Reaction Environment 4 37. A fifth pressure that is negative or that can allow for displacement of the positive pressure from reaction environment 3 is applied to Reaction Environment 4 37 to enable flow from environment 3, 30, through the purification column 35 and into reaction environment 4, 37.

A three phase column 39 is positioned downstream from Reaction Environment 4 (numeral 37 in FIG. 1) and comprises Ag/C, hydrated zirconium oxide (HZO) and charcoal. This provides the final means of removing iodine, organics, and other impurities from the final product liquor. It accepts the filtrate from Reaction Environment 4. The three phase column 39 is rinsed with a low molarity base such as 0.2 M NaOH. As such, the three phase column 39 removes iodine, organics, and other impurities from the liquid phase product stream to yield final product 51.

A three trap system 45 provides protection of the vacuum pump 47 from the system. The three trap system 45 may be positioned internal of the hot cell 12 so as to not be in contact with the ambient environment outside of the hot cell 12. A first trap T1 is a basic solution (NaOH) to trap iodine (iodine may escape as a gaseous species, such as $I_2$, under acidic conditions), the second trap T2 may be empty or water-filled to help limit the alkaline media from traveling to the pump; the third trap T3 may be Dri-Rite, or other dehydrating agent, or de-humidifying method (such as a liquid nitrogen trapping system) to eliminate humid air from passing into the vacuum pump 47. Generally the vacuum pump 47 is positioned downstream of the traps.

Check valves are attached to pressure equalization ports on all reagent bottles as these solutions are transferred to the reaction vessels by evacuating the reaction vessel. The check valves ensure pressure equalization of the reagent bottles. Check valves are also placed between the system and the reagent bottles so that backflow of solution from the system into the reagent bottles does not occur.

The system requires the ability to exhaust certain reaction vessels and columns without the use of the vacuum. All vessels that observe or hold radioactive material may be vented through an appropriate gas collection system. These vessels include but are not limited to the first, second, third, further reaction environments, isolation environment, and waste vessels. Further, the exhaust of the vacuum can be connected to the gas collection system. The exhaust must be considered radioactive and therefore appropriate precautions must be taken. It is recommended that a gas collection or gas decay system be implemented.

Despite the triple-trap system 45 between the system and the vacuum pump 47, the vacuum pump exhaust should also be tied into the gas collection/decay system. Positive pressure may be provided by compressed gas. The gas should be inert and non-reactive so as to not react with the solutions being used or introduce contaminants. For example, pressurized nitrogen 49 at between 1 and 10 psi is suitable, with 2 psi preferable. The quality level of the gas used must be taken into consideration for medical applications of the final product (recommended 99.99% UHP gases such as nitrogen, argon, or neon).

A myriad of pressures (positive and/or negative) may be applied to remotely cause transport of reaction liquor from one environment to the next. The pressures utilized will be determined empirically, based on the size of the reaction vessels and reagent containers used.

The majority of the system utilizes commercially available items with the exception of the reaction vessels and reaction vessel lids. Reagent and reaction vessels are sealed with screw top fittings seated with gasket material (such as EDPM or silicon).

All tubing connections are made with compression fittings. Adapters with luer-lock fittings are used to adapt to or otherwise received by solution manifolds. Solution manifolds direct the flow of solutions. Reagent bottles may be placed within the shielded enclosure (or hot cell) with the bulk of the system; however, it is recommended the reagent bottles are located outside of the shielded enclosure for ease of access. If located outside of the shielded enclosure, the reagent bottles are recommended to be contained in a ventilated enclosure for chemical hazard mitigation and check valves to ensure one-way solution flow.

The Mo-99 Product Bottle 51 and Fission Fragment Bottle 53 are meant to be removed from the system for delivery of the product, further processing of fission fragments, and disposal of liquid waste. For these reasons, the bottles are connected by removable means with a manipulator or other mechanical means. The bottles may be septa lid bottles and connected to the system via needles. Alternatively, the bottles are maintained in fluid communication with each other via luer-lock or quick disconnects depending on the desired usage of the system (i.e., once-through or multiple uses).

Reagent bottles utilized are disposable bottles with septa lids. The bottles may be placed in a dedicated enclosure next to but external of the shielded enclosure/hot cell 12.

Depicted as FIG. 2, a fritted reaction vessel, designated supra as the isolation vessel 29 is where the Mo-ABO solid is sequentially isolated, washed, and dissolved. The vessel is a double ended reaction vessel bottle with screw thread 52 on both ends. A medium porosity sintered glass frit 54 disposed proximal to the depending end of the vessel, and internal to the vessel is used to filter the Mo-ABO. An exemplary frit is 1.25 inches ID, 2 inches height above the frit, 4 inches total height. Preferably, the height of the vessel above the frit is increased from 2 inches to 6 inches. All other dimensions are acceptable. The top lid 56 is the same as used on the reaction vessels.

The lower lid 58 is a single port lid with a conical exit to funnel the solution. It may be comprised of any material adapted to conform to the conical shape, the material including but not limited to stainless steel, acrylic, or polymer material such as PEEK (polyether ether ketone), LDPE (low density polyethylene), HDPE (high density polyethylene), PP (polypropylene), and combinations thereof. (The bottom lid 58 further features a conical topography 60 to funnel the solution. The lids are sealed with screw threads and seated with gasket material (such as ePTFE, EDPM, or silicon).

Heat may be applied to the fritted vessel 29 with flexible electric heat tape. The heat tape may be wrapped around the glass vessel. A temperature controller such as the J-Kem may be used to control the temperature of the heat tape. Two thermocouples may be required, a set point and an over temperature control thermocouple. These thermocouples should be mounted between the fritted vessel glass body and the heat tape. Glass tape may be used to initially set the thermocouples. Wrapping insulating fiberglass cloth around the heat tape-wrapped fritted vessel is recommended. The recommended set point of the controller is determined empirically.

A layer of glass or quartz beads may be placed inside the isolation vessel 29 in order to break up solids during the washing and digestion processes. The layer is recommended to be 2-3 beads deep of 5 mm diameter beads.

Remote and automatic transfer of reaction liquor from one reaction environment to the next is a unique feature of the invented method and system. As noted supra, pressures are applied to effect transport of reaction liquors from and to serially arranged reaction environments. For example, when serially connected reaction vessels of 300 mL volume are in fluid communication with each other, the imposition of positive pressure of 5 psi to an upstream reaction vessel results in complete evacuation of that vessel within 20 to 30 seconds when 100-200 mL are present.

An embodiment of the LMC recommends simple threading of the ⅛" transfer tubing through the septa lids and extending to the bottom of the bottles. Check valves 40 can be connected via luer-lock to a needle piercing the septa lid. It is recommended that the reagent bottles be V-vials or pear shaped to ensure complete voiding of the solutions. The tubing may be cut on an angle (for example less than 45 degrees). This provides a means for assuring that the tubing does not create a seal or partial seal at the bottom of the reagent vessel, which in turn reduces flow rates.

Reaction Vessel Lids (see FIG. 2) may define threaded ports 57. Unused ports may be plugged with threaded plugs. Reaction vessels are sealed with screw threads and seated with gasket material such as PTFE (polytetrafluoroethylene), EDPM (ethylene propylene diene monomer), or silicon. For demonstrative purposes, caps were 3D printed from acrylic and the screw threads were machine drilled and tapped. PEEK and stainless steel caps were machined separately.

In an embodiment of the invention, ⅛" OD tubing is used to move solution from vessel to vessel. The connections are made by placing nuts with ¼"-28 thread over the ⅛" OD tubing followed by ferrules with stainless steel rings for ⅛" OD tubing. This assembly is tightened by hand (fingers) into a ¼"-28 female to luer-lock male adapter. By tightening the nut, the ferrule compresses and creates a seal around the tubing. This assembly is then used to connect to solution line stopcock manifolds.

¼"-28 female to luer-lock male adapters connect to the solution stopcock manifold via the luer-lock. Simple twisting of the nut will engage the seal. The manifolds are connected using the same luer-lock male adapters on one of the ⅛" OD tubings. The other end features the same assembly described above with the exception that a ¼"-24 female to luer-lock adapter is utilized in place of the luer-lock male adapter.

Fluid transfer rates will vary depending on the inner diameter of the conduits utilized and any resistance encountered given the viscosity of reactant fluids. For example, transference of 50 mL of solution through a 16 Ga needle may be accomplished within 20-30 seconds. However, transferring the same volume through a 0.3 micron filter may take 10 minutes.

An automated control system 46 for a stopcock manifold is provided. A commercially available stopcock "switch board" is available through the Eckert & Ziegler (Berlin, Germany) Modular Lab series. These modules enable simple placement of the 3-fold stopcock manifold described above. The manifolds are held in place with a locking bar. The system is controlled with software provided by E&Z. Alternate methods are available. In place of the E&Z system, servo motors can be purchased and programmed to operate the valves. Generally, electrical connections are made from each actuated valve to a "board" that is ultimately connected to the control system 46. The switchboard may communicate with remote components of the system (e.g., the valves 40) either via hardwire or using wireless communications, such as low-power Bluetooth, RFID, and other wireless identification and communication methods.

The control system 46 may provide a means for indicating when reagents may be replenished during system operation. Sensors may be added to each of the reagent vessels to facilitate this replenishment, with replenishment cues based on solution volume, mass, or flow rate out of the reservoirs. The automated system may comprise a database of experimental parameters to determine when reactions within experimental environments are complete. Such determination will instigate transfer to the next phase of the protocol.

Generally, a database comprised of experimental benchmarks and parameters is employed to determine when reactions within all of the reaction environments are serially complete. An embodiment of the automated process facilitates the isolation of target moieties within 120 minutes.

Positive and negative pressure systems are featured in the invention. The positive pressure system is directly attached to a regulator attached to a gas cylinder 49. The ⅛" PEEK tubing may be swaged with standard stainless steel ⅛" Swagelok connections to the regulator. Positive pressure can be introduced to the system through another E&Z module. The ⅛" PEEK line is connected via similar connections described for the solution lines. A vacuum is provided through the same E&Z unit. Swagelok connections will be used to connect to the vacuum. A pressure release valve will be used to ensure the system modules and glassware are not over-pressurized when gas is added to the system. Alternate methods are available. In place of the E&Z system, flow controllers can be purchased from commercial vendors.

Preferably, valves are closed after use unless otherwise specified. This will ensure that vacuum is achieved on desired sections of the system and minimize troubleshooting efforts.

Any transfer may be accomplished by ensuring vacuum is applied to the vessel in which the solution/mixture is desired to be transferred to, and positive pressure or pressure equalization is applied to the vessel from which the solution is being transferred. Direct positive or negative pressure to the vessel is not necessary; there are multiple paths in which the user can apply pressure differentials. For example, each reagent bottle can be used to provide pressure equalization to each reaction vessel and series of reaction vessels. Attention should be paid to adding reagents that may react together. For example, adding NaI carrier followed by addition of $AgNO_3$ reagent may cause precipitation of AgI in the line which may clog the lines or affect the efficiency of these steps. These types of potentially problematic reactions have been monitored during the testing phase of a prototyped system.

While the invented system is touted as either a semi-automatic or an automatic system, virtually all components of the system are visible, with the exception of heat tape and/or insulating tape that would wrap around the insulation environment.

EXAMPLE

Over-arching objectives of the semi-automatic or fully automatic process includes optimizing the safety to operators while also reducing cost, reducing human error, and increasing reproducibility. System pre-checks are conducted by the automated system and include the following:
Ensure all solution valves are closed;
Ensure all vacuum valves are closed;
Ensure all gas collection valves are closed;
Set the temperature controller as follows:
   a. Set Power to 50-500 mL,
   b. Set point: 90° C.,
   c. Overtemp set point: 150° C.,
   d. Ensure heat tape is in place,
   e. Ensure thermocouples are in place,
   f. Ensure insulation is in place; and
Turn on Vacuum Introduction of the 99Mo stock solution after digestion may be accomplished by first applying the vacuum on the first reaction environment 16. A vacuum is used for the transfer. The vacuum may remain on for the duration of the entire experiment, for a portion of the experiment (but nevertheless isolated via valve actuations) or turned off when not in use.

All valves are opened connecting the vacuum to the first reaction environment vessel 16, ensuring that all other valves (such as vents, solution transfers to the second reaction environment, etc.) to the first reaction environment 16 are closed. This action will apply a vacuum to the first reaction environment vessel 16.

When the valves between the stock solution and first reaction environment vessel 16 are opened, the solution should transfer. The check valve on the reagent bottle will open automatically to equalize the pressure and ensure that a complete vacuum does not occur in the reagent bottle. After the transfer is complete, the valves connecting the first reaction environment vessel 16 to the vacuum are closed, followed by the valves connecting the first reaction environment vessel 16 to the reagent bottle.

Transfer of solution from the first reaction environment 16 to the second reaction environment 22 through filters may be accomplished by closing connections to all other vessels. The valve positioned between the environments is opened. Also, the valve connecting the first reaction environment 16 to the gas collection/decay system is opened. Then, the valves connecting the second reaction environment 22 to the vacuum is opened. The solution should pass through the filters, collecting particulate, and entering the second reaction environment 22. If the transfer is slow or does not complete, positive pressure may need to be introduced into the first reaction environment 16. This is done by closing the first reaction environment 16 to gas collection/decay and introducing a small positive pressure to that environment vessel.

All lines, connections, and bottles are rated to 100 psi; typically, positive pressures will not exceed 10 psi. Positive pressure introduced to the system is adjusted in accordance with the needs of each experiment. For simplicity, it is recommended that a positive pressure of 5 psi be applied for transfers (if required).

The Mo-ABO precipitation step is the key purification step of the entire LMC process. Molybdenum is selectively precipitated with ABO and then washed to remove the majority of fission fragments. After the wash stage, the Mo-ABO solid is dissolved with a mixture of $NaOH/H_2O_2$. The fritted vessel 29 itself is a double ended reaction vessel (with screw threads on both ends). The top end 50 is capped with the reaction vessel cap; the bottom end is capped with a single-port conical cap 60. There are six ports on each reaction vessel cap. Ports not in use will be plugged. The bottle is wrapped with heat tape monitored with thermocouples. A temperature controller with an over-temperature safety feature is recommended to control the heat tape. The recommended controller settings are 90° C. for the set point and 120° C. for the over-temperature.

There are two scenarios for washing the Mo-ABO solids: introduce wash solutions from the top of the vessel through the same path as the Mo-ABO; or introduce wash solutions from the bottom of the vessel.

Scenario 1 (top wash): Wash solutions flow through the same path by which the Mo-ABO was introduced. This scenario will wash the second reaction environment vessel and the lines to ensure complete transfer of the Mo-ABO solid and minimize loss of product. To ensure adequate washing/mixing of the solid, employ agitation provided by positive pressure from below the frit may be employed.

Positive-pressure agitation: Close solution valves connected to the top of the fritted vessel 29. Open valve connecting the fritted vessel 29 to the gas collection/decay system. Open positive gas pressure to the third reaction environment 30, while ensuring all other connections to the third reaction environment 30 are closed. A solution valve is opened connecting the third reaction environment 30 to the fritted vessel (i.e., the isolation environment) 29. The positive pressure will be forced through the underside of the frit 54 and provide agitation to mix the solid and wash solutions above the frit 54. This agitation method will be the same used for the digestion of Mo-ABO.

Scenario 2 (bottom wash): Initial wash solutions (first two or three wash solutions) flow through the same path by which the Mo-ABO was introduced. This scenario will wash the second reaction environment 22 and the lines to ensure complete transfer of the Mo-ABO solid and minimize loss of product. The remainder of the wash solution flows through the bottom of the fritted vessel (i.e., the isolation environment 29) and up through the frit 54. In this method, the bottom cap of the frit should be one of the 7-port caps. The wash solution forces the Mo-ABO solid off the surface of the frit 54. Agitation is provided using the positive-pressure agitation method described above.

Digestion of Mo-ABO: Using the Top Wash and positive-pressure agitation methods, the $NaOH/H_2O_2$ digestion solution is transferred through the second reaction environment 22 and into the fritted vessel (isolation environment 29). It is recommended to turn on the heat tape once digestion solution is within the vessel, to minimize the chance of burning the solid, then to close all valves to the fritted vessel. Open the fritted vessel to the C-filter (activated charcoal filter connected to the gas collection system). Open the C-filter to the gas collection/decay system. Agitate the solution by the positive-pressure method, as described above.

The amount of time required for the digestion will need to be determined experimentally and is dependent on the individual system. Another parameter monitored is color or solid formation, said monitoring by visual inspection or remotely via camera-based sensors and comparison to predetermined data-sets of colors related to a specific product.

Fluid transfers can be achieved by imposing positive and negative pressure at set time points and lasting for a set period of time. After adding in all the reagent transfers/additions and transfer of reaction mixture from one environment to the next, the process takes about 2 hours. Typical dissolution periods for each solution are 2-5 minutes. Therefore it is recommended that the system be agitated at temperature for 2-5 minutes for each digestion step. There are two digestion steps; therefore, all the Mo-ABO does not have to be dissolved in the first digestion step. After each digestion step, the Mo-ABO solid is transferred to the third reaction environment 30 by terminating the positive pressure to the third reaction environment vessel 30, closing the fritted vessel to the C-filter, opening the fritted vessel to the second reaction environment, 22, opening the second reaction environment 22 to positive pressure, and opening the third reaction environment vessel 30 to vacuum.

A final wash is sent through the fritted vessel and the entire solution is passed through the Ag/C column 35. The Ag/C column 35 may be a straight column that employs glass wool to hold the Ag/C within the column. A filter cartridge can be placed after the column.

Preferably, the flow through the Ag/C column 35 can be relatively slow (~1 mL/min).

This flow is achieved by placing a static vacuum on the fourth reaction environment 37 or applying a small positive pressure on the third reaction environment 30 while the fourth reaction environment 37 is open to gas collection. A static vacuum is applied by closing all valves to the fourth reaction environment 37, opening the fourth reaction environment 37 to the vacuum for a short period of time (30 sec), and then closing the fourth reaction environment 37 to the vacuum. If the fourth reaction environment 37 is then connected to the third reaction environment 30 through the Ag/C column 35, the static vacuum of the fourth reaction environment 37 will pull solution from the third reaction environment 30 through the column 35 and into the fourth reaction environment 37. The static vacuum can be applied as needed to fully transfer the solution. With the positive-pressure approach, a more constant stream/drip can be achieved, depending on the pressure applied.

The third reaction environment vessel 30 is washed with NaOH, which is subsequently used to wash the Ag/C column 35. The solutions are collected in the fourth reaction environment vessel 37. Once there, another iodine precipitation step is performed. Sodium iodide carrier and $AgNO3$ are added to the solution. The solution can be agitated with positive or negative pressure.

The final purification of this solution is also a filtration step, with precipitated Ag halides captured on the 3-phase column 39. Preferably, the flow through the 3-phase column 39 is relatively slow (~1 mL/min). This flow is achieved by applying a static vacuum to the Mo-99 Product Bottle 51 or applying a small positive pressure on the fourth reaction environment 37 while the Product Bottle 51 is open to gas collection, as discussed for the transfer from the third reaction environment 30 to the fourth reaction environment 37 through the Ag/C column 35.

Upon completion of the entire process, which may take 1-2 hours in semi-automated or fully automated mode, the system automatically initiates a completion procedure which includes the following steps:
 Close all vacuum valves;
 Close all solution valves; and
 Open all gas collection valves, so as to allow the system to equilibrate to ambient pressure.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. An automated method for isolating a targeted isotope, the method comprising:
   a) placing a liquor containing isotope source material into a closed loop pneumatic system;
   b) contacting the source material to positive and negative pressures to transport the source material to a first environment for precipitating out non-targeted isotopes;
   c) transporting remaining liquid containing targeted isotope to a second environment containing nitric acid for precipitating the targeted isotope;
   d) transporting the precipitated targeted isotope to a third environment for re-liquifying the precipitated targeted isotope;
   e) transporting the liquefied targeted isotope to a series of filters and sorbents to remove iodine, organics and other impurities from the liquefied targeted isotope; and
   f) transporting the filtered liquefied targeted isotope to a final product container wherein the automated method occurs within 120 minutes without physical movement of reaction vessels or bottles.

2. The method as recited in claim 1 wherein the positive and negative pressures are applied when predetermined reaction parameters are established during each of the steps.

3. The method as recited in claim 2 wherein the reaction parameters are data points selected from the group consisting of reaction time, product temperature, reaction vessel temperature, precipitate opacity, reaction vessel pressure, reaction vessel product mass, reaction time, pH changes and combinations thereof.

4. The method as recited in claim 1 wherein the step of precipitating the targeted isotope comprises complexing the targeted isotope with aldoximes and ketoximes compounds selected from the group consisting of α-benzoin oxime, anti-diphenylglyoxime, 1,2-cyclohexanedione dioxime, dimethylglyoxime, (E)-benzaldehyde oxime, other di-oximes, and combinations thereof.

5. The method as recited in claim 1 wherein the precipitated targeted isotope is separated from liquid phase containing nontargeted isotopes.

6. The method as recited in claim 1 wherein fluid access to the environments is controlled via remotely actuated valves.

7. The method as recited in claim 6 wherein the valves are actuated based on reaction times within the environments.

8. The method as recited in claim 1 wherein fluid access to the first environment is prevented when the third environment is accessed.

9. The method as recited in claim 8 wherein valves controlling access to the first environment are closed when valves controlling access to the second and third environments are open.

10. The method as recited in claim 5 wherein the targeted precipitated isotope is liquefied with alkaline solution comprising between 0.2 M and 0.4 M NaOH.

11. The method as recited in claim 1 wherein the precipitated targeted isotope is filtered with acidic solution to create retentate comprising fission fragments, unused complexing compound, Rh and Ru carrier, $KMnO_4$, and acid washes.

* * * * *